United States Patent [19]

Magnuson

[11] 4,062,598
[45] Dec. 13, 1977

[54] WEDGE BLOCK LOCK FOR VEHICLE TRACK END CONNECTORS

[75] Inventor: Roland A. Magnuson, Seattle, Wash.

[73] Assignee: The United States of America as represented by the Secretary of the Army, Washington, D.C.

[21] Appl. No.: 712,629

[22] Filed: Aug. 9, 1976

[51] Int. Cl.² .................................. B62D 55/20
[52] U.S. Cl. ..................................... 305/58 PC
[58] Field of Search ............. 305/58 PC, 58 R, 59, 305/36, 42; 403/186, 374, 370, 154

[56] References Cited

U.S. PATENT DOCUMENTS

| | | | |
|---|---|---|---|
| 2,129,696 | 9/1938 | Knox | 305/36 |
| 2,234,927 | 3/1941 | Kubaugh | 305/36 |

FOREIGN PATENT DOCUMENTS

| | | | |
|---|---|---|---|
| 1,234,557 | 2/1967 | Germany | 305/58 PC |
| 1,111,973 | 7/1961 | Germany | 305/58 PC |

Primary Examiner—Robert B. Reeves
Assistant Examiner—John P. Shannon
Attorney, Agent, or Firm—Peter A. Taucher; John E. McRae; Nathan Edelberg

[57] ABSTRACT

In a track laying vehicle having ground-engagement shoes, the pivot pins of the shoes are coupled together by connectors which are locked in place by means of tapered wedge blocks; the mating surfaces of the pins are also tapered. The tapers on the blocks and coupled pins are in axial directions so that disturbing torques generated during normal shoe operations have no effect on the taper lock action.

5 Claims, 3 Drawing Figures

WEDGE BLOCK LOCK FOR VEHICLE TRACK END CONNECTORS

BACKGROUND AND SUMMARY OF THE INVENTION

In track-laying vehicles it is common to connect the pins on adjacent shoes by link type connectors that encircle the exposed ends of the pins. Sometimes these connectors are locked to the pins by means of tapered wedges, as shown for example in U.S. Pat. No. 2,129,696 issued to H. A. Knox on Sep. 13, 1938. Usually the coupled pins and wedge block are tapered so that the block moves radially normal to the pins during the wedge lock action movement. The direction of taper is such that reaction torques produced during normal show movement act in the same plane as the taper lock action plane. Therefore vibrational effects tend to produce an undesired unlocking of the wedge block. The present invention proposes a wedge block arrangement in which the wedge action plane is along the pin axes such that normal reaction torques generated during service have no disturbing effect on the wedge lock.

THE DRAWINGS

Figure 2:
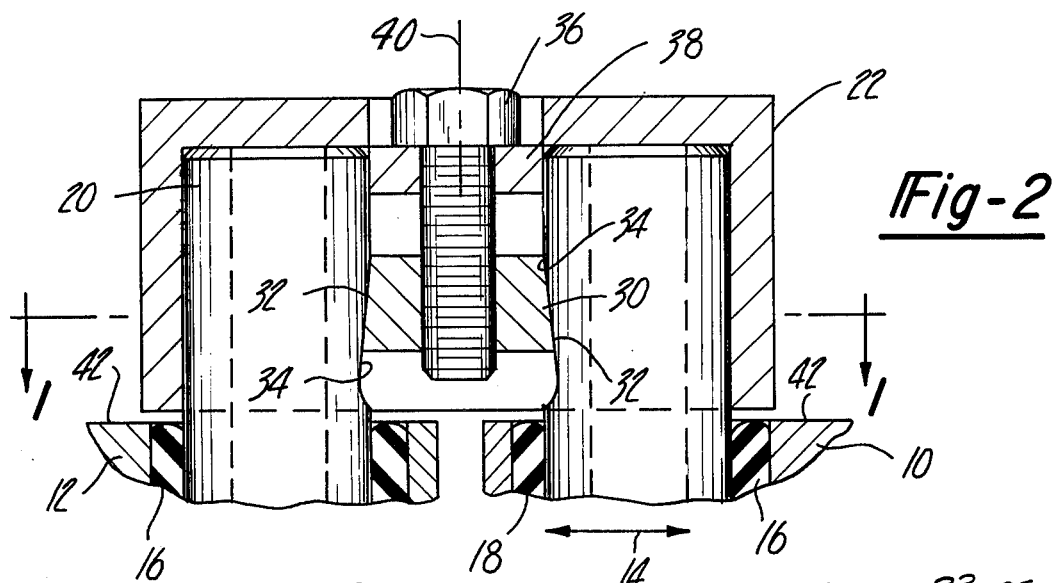
FIG. 2 is a sectional view taken on line 2—2 in FIG. 1.

The drawing fragmentarily show a vehicle track of the general nature more completely shown and described in U.S. Pat. No. 3,467,446 issued to E. Seelbach et al on Sept. 1, 1969. Present FIG. 2 is a sectional view looking downwardly through the adjacent end portions of two track shoes 10 and 12 forming part of an endless track system; each show is of similar construction. The direction of track motion is denoted by numeral 14. Track show 10 is provided with a transverse circular bore 16 that receives a compressed elastomeric bushing 18 and coupling pin 20. A similar bushing and coupling pin assembly is received in a transverse bore 16 in adjacent portion of track show 12. The exposed ends of the coupling pins are received in a hollow connector housing 22 that is internally configured to define two circular bores 24 having diameters closely conforming to the diameters of pins 20. The intervening connector housing space between bores 24 is left vacant, whereby the housing defines a flat internal roof surface 26 and a flat internal floor surface 28. The space between the roof and floor surface is occupied by a wedge block 30 whose side surfaces 32 are tapered as shown in FIG. 2. The facing side surfaces of coupled pins 20 are tapered, as at 34, the tapers on the mating surfaces being the same whereby the block has facial engagement with each pin for the entire thickness of the block.

Block 30 is floatably and slidably mounted between the connector housing guide surfaces 26 and 28 for movement in an axial direction, i.e. parallel to the axes of coupled pins 20. Block movement is obtained by means of a bolt 36 or similar threaded element having its thread surface engaged with threads in block 30. The actuation head of the bolt abuts against the outer surface of the bridge 38 consituting part of the end wall of connector housing 22. Turning force applied to the head of bolt 36 produces rectilinear movement of block 30 along the axis denoted by numeral 40; connector housing surfaces 26 and 28 prevent rotation of block 30 around bolt axis 40.

As block 30 is moved along axis 40 away from the side surfaces 42 of the track shoes 10 and 12, the tapered block surface 32 exert lateral pressures on the tapered surfaces 34 of the coupled pins 20, thereby urging the coupled pins literally apart to positions tightly located against the surfaces of connector bores 24. The outward lateral movement is relatively slight, a few thousandths of an inch.

It is customary for the aforementioned elastomeric bushings 18 to be compressed between the pins 20 and the track shoe bores 16 in order to provide a sealed joint without significant play between the pins and shoes, see for example U.S. Pat. No. 3,357,750 isued to R. K. Reynolds et al on Dec. 12, 1967 for structural details and operational description. The coupling pins 20 are usually locked or located so that adjacent track shoes 10 and 12 are slightly angled to one another as denoted by angle A in FIG. 1. The slight angularity is selected to minimize the torsional stress generated in each elastomeric bushing 18 as the shoes change direction during passage around the sprockets and guide wheels. In this connection it will be appreciated that the tightly compressed bushings 18 frictionally engage the surfaces of the pins 20 and bores 16 such that the inner surface of each bushing is essentially fixed to the pin and the outer surface of the bushing is essentially fixed to the shoe; the bushing therefore undergoes torsional strain during normal shoe operation.

The torsional stress is translated into a rotational torque on the pins 20. In prior art connector lock arrangements such torques tended to unloosen the wedge block because the wedge block plane of action was radial, i.e. coincident with the radial place of action of the disturbing torque. See for example the aforementioned Patent to E. Seelbach et at wherein the wedge plate 20 is stressed by the screw 24 to exert a lock force through a radial plane extending normal to the axes of coupling pins 2,2. In contrast, the arrangement of the present invention constrains the wedge block 30 to movement in an axial direction parallel to the axes of pins 20 so that potentially disturbing torques generated on pins 20 and acting radially do not tend to unloosen the wedge block 30 from its locked position.

Preferably the roof surfaces 26 and 28 are widely spaced so that the roof-floor distance is only slightly less than the diameter of each pin 20. The wide spacing increases the vertical thickness of wedge block 30, thereby increasing the frictional contact area between surfaces 32 and 34. The wide roof-floor spacing also increases the length of these guide surfaces 26 and 28 in the FIG. 1 plane, thereby increasing the ability of the wedge block to resist turning about axis 40; the improvement manifests itself as an increased service life factor.

Figure 1:
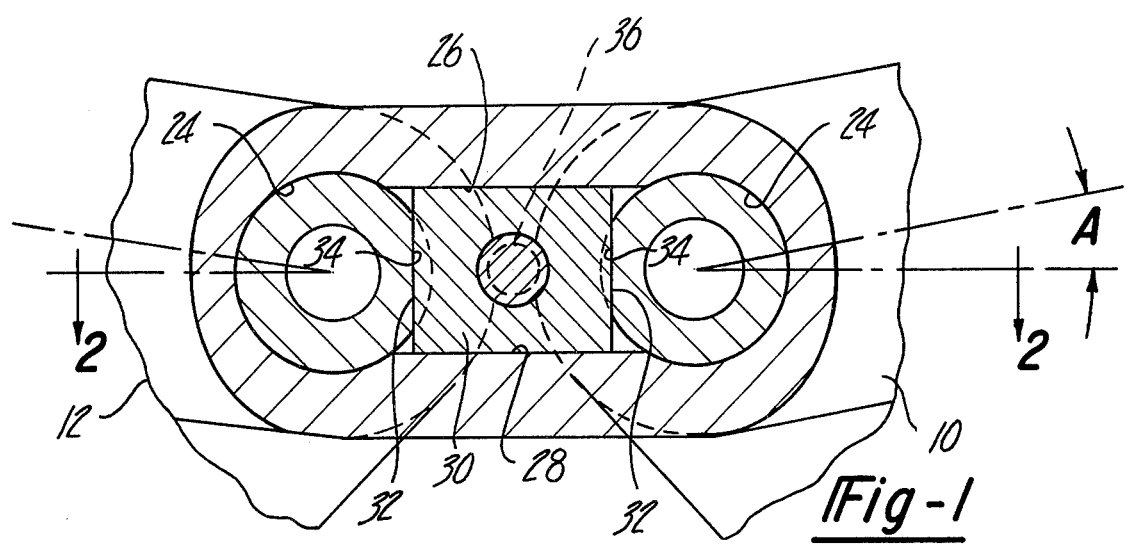
FIG. 1 is a sectional view taken on line 1—1 in FIG. 2, and showing a coupling pin connector structure constituting a preferred embodiment of the invention.

The embodiment of FIG. 1 and 2 is a preferred embodiment since it provides the above-mentioned advantages while also shielding the ends of the coupling pins from dirt, sand or other foreign material that might otherwise reach the pin ends. Such shielding is advantageous when the pins are formed as hollow tubes, as shown in FIGS. 1 and 2. Unless the ends of such hollow tubes are sealed there is a possibility for dirt to collect in the tubes and increase the weight of the track. The tracks sometimes move at high speeds so that undesired weight increases have an adverse loading effect.

Figure 3:
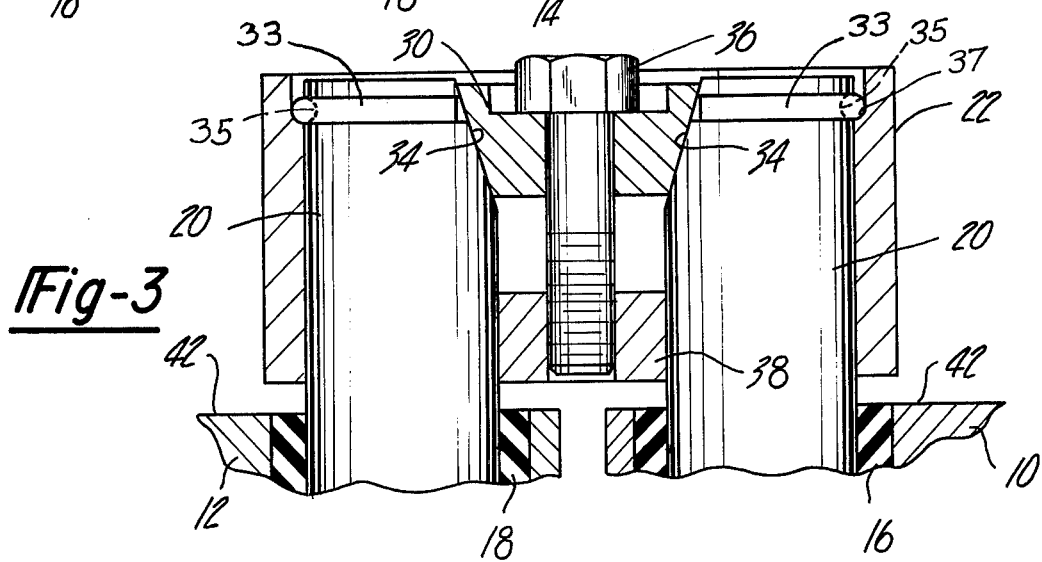
FIG. 3 is a sectional view taken along the same line as FIG. 2, but illustrating another embodiment of the invention.

FIG. 3 illustrates an embodiment of the invention in which the bolt 36 has its head abutting against a wedge block 30 rather than the aforementioned bridge 38. In this case the threaded portion of the bolt meshes with threads formed in an end wall 38 of the connector 22 so that inward turning force on the bolt head draws block 30 toward connector wall 38, thereby exerting wedge force on the axially tapered surfaces 34 of the pins 20. The arrangement of FIG. 3 is gnerally similar in operational mode to the arrangement of FIGS. 1 and 2, the difference being merely that the wedge block is drawn toward the side surfaces 42 of the shoes during the lock operation rather than away from the shoe side surfaces. The wedge block 30 of FIG. 3 is guided for axial movement by connector housing surfaces similar to surfaces 26 and 28 shown in FIG. 1.

Connector housing 22 may be located a desired distance from shoe side surfaces 42 by means of wire rings 33; each ring has a C-shaped configuration. Before installation of wedge block 30 against the tapered pin surfaces 34 rings 33 are inserted into peripheral grooves 35 formed in pins 20. The connector 22 may be temporarily located against shoe side surface 42 to facilitate installation of each ring into the associated groove. When bolt 36 is turned to draw block 30 toward connector wall 38 the rings 33 react against shoulder surfaces 37 on the connector. The connector thus automatically takes a precise spacing from the shoe side surface 42; the shoes therefore correctly track in a single common path, one behind the other. Block 30 is of sufficient axial thickness to prevent inadvertent dislodgement of rings 33 from the associated grooves.

Some refinements, modifications and structural details may be made without departing from the invention as recited in the appended claims. An essestial feature of the invention is the guidance of the wedge block and the direction of wedge block taper whereby the block moves axially to wedge the coupled pins tightly against the connector housing surfaces. With this arrangement radial torques generated in the coupled pins 20 during service are ineffective to disturb the wedge lock because the wedge lock force is exerted axially wheras the potentially disturbing torques act radially.

I wish it to be understood that I do not desire to be limited to the exact details of construction shown and described for obvious modifications will occur to a person skilled in the art.

I claim:

1. In a track-laying vehicle; an endless track comprising a series of ground-engagement shoes serially arranged one behind the other; coupling pins extending transversely through each shoe adjacent the shoe leading and trailing ends; each coupling pin having exposed ends extending outwardly beyond the shoe side surfaces; a hollow connector telescoped over the exposed ends of adjacent coupling pins on adjacent shoes; a tapered wedge block slidably guided within each hollow connector for rectilinear axial movement in a plane passing through the axes of the coupled pins; the facing surfaces of the coupled pins being flattened and tapered in an axial direction, each wedge block having tapered side surfaces engaged with the tapered surfaces of the coupled pins, whereby axial movement of the wedge block in one direction wedges the coupled pins apart to positions locked against internal connector surfaces; and a threaded bolt element engaging an end wall of each connector and the associated wedge block to produce axial movement of the block, as necessary to lock or unlock the coupled pins from the respective connector; the end wall of each connector and the associated wedge block cooperatively exerting a tensile force on the bolt element as the block wedges the coupled pins apart.

2. In the vehicle track of claim 1: each connector having a flat internal roof surface and a flat internal floor surface; the associated wedge block having upper and lower faces slidably engaged with the roof and floor surfaces to confine the block to movement paralleling the pin axes.

3. In the vehicle track of claim 2: the spacing between the roof and floor surfaces being only slightly less than the diameter of the coupled pins.

4. In the vehicle track of claim 1: each coupling pin having an elastomeric interference bushing compressively fitting within the associated shoe; each bushing exerting a reaction torque on the pin normal to the pin during shoe movement operations.

5. In the vehicle track of claim 1: each connector comprising a hollow housing having spaced circular bores receiving the exposed ends of the coupled pins, the intervening housing space between the circular bores being contoured to define spaced roof and floor surfaces extending parallel to an axial plane containing the bore axes; the wedge block being slidably engaged with the roof and floor surfaces, whereby the block is effectively confined to slidable movement in the aforementioned axial plane.

* * * * *